United States Patent
Hayes

(10) Patent No.: US 12,433,259 B2
(45) Date of Patent: Oct. 7, 2025

(54) AUTOMATED SYSTEM AND METHOD FOR APPLICATION OF A BEEHIVE TREATMENT

(71) Applicant: BEEKEEPING 101 LLC, Mansfield, OH (US)

(72) Inventor: Gerald Hayes, Mansfield, OH (US)

(73) Assignee: BEEKEEPING 101 LLC, Mansfield, OH (US)

( * ) Notice: Subject to any disclaimer, the term of this patent is extended or adjusted under 35 U.S.C. 154(b) by 0 days.

(21) Appl. No.: 18/411,865

(22) Filed: Jan. 12, 2024

(65) Prior Publication Data
US 2024/0237622 A1 Jul. 18, 2024

Related U.S. Application Data

(60) Provisional application No. 63/479,844, filed on Jan. 13, 2023.

(51) Int. Cl.
*A01K 51/00* (2006.01)
*B25J 5/00* (2006.01)
(Continued)

(52) U.S. Cl.
CPC .............. *A01K 51/00* (2013.01); *B25J 5/007* (2013.01); *B25J 9/20* (2013.01); *B25J 15/0019* (2013.01);
(Continued)

(58) Field of Classification Search
CPC .... A01K 51/00; G05D 2105/50; G05D 1/648; G05D 1/226; B25J 9/162; B25J 9/1697;
(Continued)

(56) References Cited

U.S. PATENT DOCUMENTS 7,922,559 B2 4/2011 Cook
10,779,472 B2 9/2020 Robertson et al.
(Continued)

FOREIGN PATENT DOCUMENTS

BR 112014004438 B1 3/2020
KR 20190031391 A 3/2019

OTHER PUBLICATIONS

Written Opinion of the International Searching Authority dated May 21, 2024.
(Continued)

*Primary Examiner* — Zoe Tam Tran
(74) *Attorney, Agent, or Firm* — Jacob M. Ward; Ward Law Office LLC

(57) ABSTRACT

Embodiments of the present disclosure may include an automated system for application of beehive treatment to a beehive, including a movable carriage, and a reservoir configured to hold the beehive treatment. Embodiments may also include a vision system disposed on the movable carriage and configured to detect an entrance of the beehive, an applicator system in fluid communication with the reservoir, the applicator system including an end effector configured to deliver the beehive treatment to the beehive through the entrance to the beehive. Embodiments may also include a controller in communication with the movable carriage, the vision system, and the applicator system.

20 Claims, 6 Drawing Sheets

(51) Int. Cl.
*B25J 9/20* (2006.01)
*B25J 15/00* (2006.01)
*G05D 1/226* (2024.01)
*G05D 1/648* (2024.01)
*G05D 105/50* (2024.01)

(52) U.S. Cl.
CPC ............ *G05D 1/226* (2024.01); *G05D 1/648* (2024.01); *G05D 2105/50* (2024.01)

(58) Field of Classification Search
CPC . B25J 11/0075; B25J 5/00; B25J 5/007; B25J 9/20; B25J 15/0019
USPC .......................................................... 449/2
See application file for complete search history.

(56) References Cited

U.S. PATENT DOCUMENTS

| | | | |
|---|---|---|---|
| 11,723,366 B2 | 8/2023 | Hannus et al. | |
| 2004/0219863 A1 | 11/2004 | Willacy | |
| 2005/0126144 A1* | 6/2005 | Koselka | A01D 46/30 56/10.2 R |
| 2006/0213167 A1* | 9/2006 | Koselka | A01D 75/00 56/10.2 A |
| 2014/0121836 A1* | 5/2014 | Ban | B25J 9/0093 700/259 |
| 2014/0212520 A1 | 7/2014 | Del Vecchio | |
| 2014/0277694 A1* | 9/2014 | Ichimaru | B25J 9/1612 700/218 |
| 2018/0160656 A1 | 6/2018 | Ben-Shimon et al. | |
| 2019/0261566 A1* | 8/2019 | Robertson | G06T 7/50 |
| 2020/0120886 A1* | 4/2020 | Geltner | A01G 7/04 |
| 2020/0368770 A1* | 11/2020 | Ooe | B25J 13/089 |
| 2021/0275566 A1 | 9/2021 | Paldi et al. | |
| 2022/0295760 A1 | 9/2022 | Radzyner | |
| 2024/0000086 A1 | 1/2024 | Grose et al. | |
| 2024/0341216 A1* | 10/2024 | Fujii | G05D 1/622 |

OTHER PUBLICATIONS

Bechar, Avital, et al., "Agricultural robots for field operations: Concepts and components", Biosystems Engineering, vol. 149, Sep. 2016, pp. 94-111, Elsevier, https://doi.org/10.1016/j.biosystemseng.2016.06.014.

Sheikh, Knuval, "A Growing Presence on the Farm: Robots", Article: The New York Times, Feb. 13, 2020, https://www.nytimes.com/2020/02/13/science/farm-agriculture-robots.html.

List, Jenny, "A New Open-Source Farming Robot Takes Shape", Blog: hackaday.com, Mar. 5, 2021, https://hackaday.com/2021/03/05/a-new-open-source-farming-robot-takes-shape/.

Alexander, Taylor, "Introducing Acorn, a precision farming rover from Twisted Fields", Research Blog: community. twistedfields.com, Feb. 2021, https://community.twistedfields.com/t/introducing-acorn-a-precision-farming-rover-from-twisted-fields/17.

Melgares, Pat, "Automation in the field: Robots, drones are becoming agriculture's modern-day workhorses", Research Magazine, Kansas State University, https://www.k-state.edu/seek/fall-2019/robots-drones-becoming-tools-in-agriculture/index.html.

\* cited by examiner

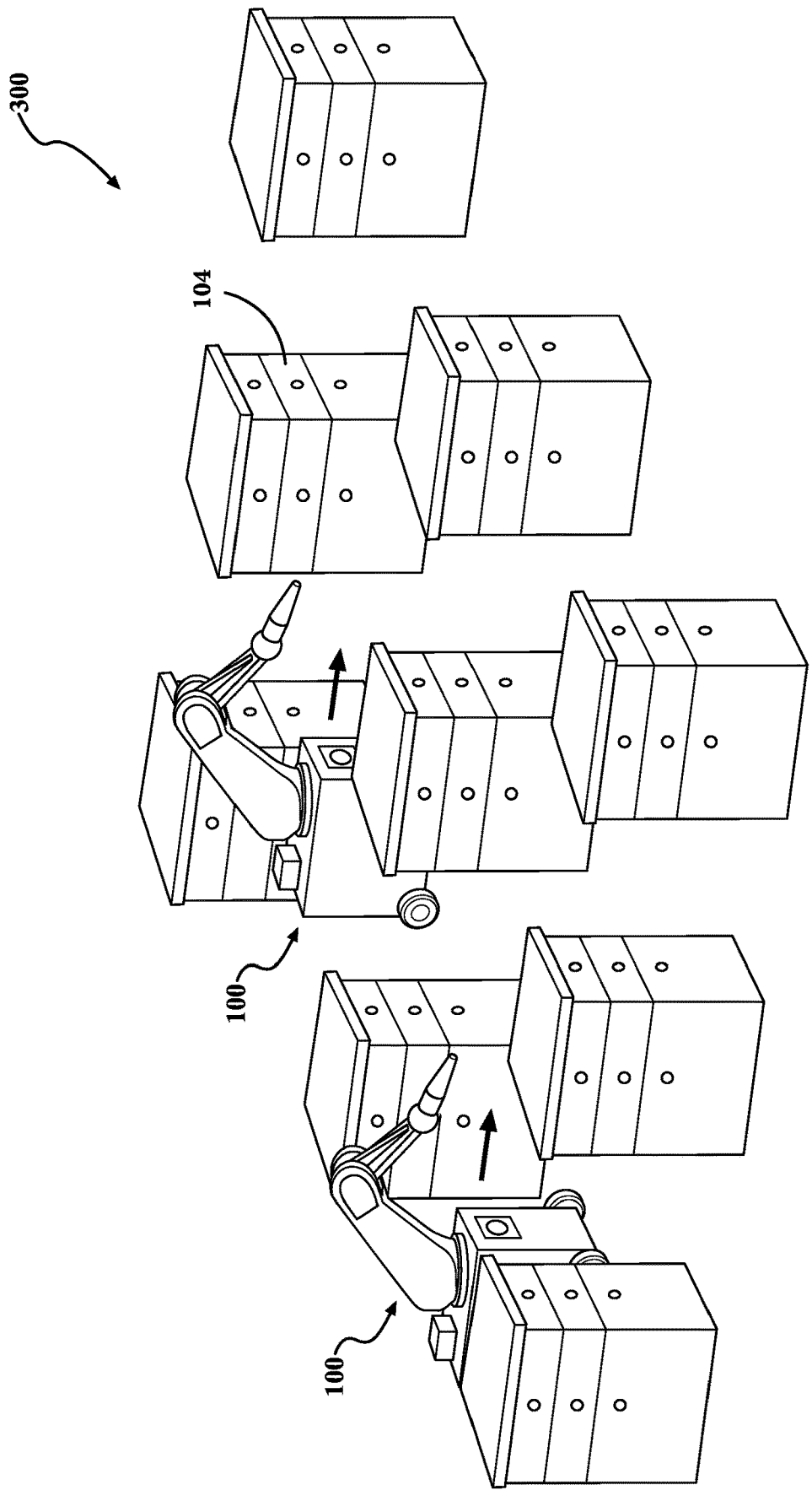

AUTOMATED SYSTEM AND METHOD FOR APPLICATION OF A BEEHIVE TREATMENT

CROSS-REFERENCE TO RELATED APPLICATIONS

This application claims the benefit of U.S. Provisional Application No. 63/479,844 filed on Jan. 13, 2023. The entire disclosure of the above application is incorporated herein by reference.

FIELD

The present technology includes articles of manufacture, systems, and processes that relate to application of a beehive treatment to beehives.

Introduction

This section provides background information related to the present disclosure which is not necessarily prior art.

More food is desperately needed for our growing world. As farms expand, they contribute to climate change through the increased use of land, water, chemical treatments, and agricultural machinery, affecting crop production itself in a vicious cycle. To end this cycle, advancements to minimize crop loss and maximize production are needed. A key advancement in the United States (U.S.) has been the use of the Western Honeybee (*Apis mellifera*) to provide for increased pollination, contributing billions to the value of U.S. crop production alone and greater than 9% to crop production across the world. In the past 15 years, dramatic honeybee losses during overwintering have been reported in the U.S. and Europe, threatening crop production.

Various approaches have been developed for the application of beehive treatments to beehives. These approaches may typically involve manual labor and lack automation, resulting in inefficiencies and limitations in terms of accuracy and consistency. Manual application of beehive treatments to beehives may require significant time and effort, as well as the risk of disturbing the bees and potentially causing harm to the bees or the beekeeper. Additionally, manual application may result in inconsistent coverage and dosage of the beehive treatment, leading to suboptimal results.

One approach includes the use of handheld sprayers or applicators to manually apply the beehive treatment to the beehive. This approach requires the beekeeper to physically approach each beehive and manually spray or apply the product, which may be time-consuming and labor-intensive. Furthermore, the accuracy and consistency of the application may vary depending on the skill and technique of the beekeeper, leading to inconsistent results.

Another approach involves using fixed or stationary systems for the application of beehive treatments to beehives. These systems typically consist of a fixed structure or platform with a reservoir of the beehive treatment and an applicator mechanism. However, these fixed systems lack the flexibility and adaptability to effectively reach and apply the product to different beehives in various locations. The fixed nature of these systems may result in a limited ability to accommodate different hive configurations and may require the beekeeper to manually position the beehive in close proximity to the system.

In a commercial setting, beehives may be kept in large groups, making it difficult to deliver treatment to all the beehives by hand. Manual treatment can also be time consuming and inefficient. Further, manual delivery may be disruptive to beehives, or to humans who are in contact with the beehives, and manual delivery may require extended human contact with pesticides. Additionally, the entrance to beehives may be located on the underside of the beehive, making it even more difficult to manually deliver the necessary treatment to beehives.

Accordingly, there is a continuing need for an automated delivery system for a beehive treatment that minimizes disturbing the beehives and that allows for consistent, quicker, and more efficient treatment of the beehives.

SUMMARY

In concordance with the instant disclosure, an automated delivery system for a beehive treatment that minimizes disturbing the beehives, and that allows for consistent, quicker, and more efficient treatment of the beehives, is surprisingly discovered.

The present technology includes articles of manufacture, systems, and processes that relate to an automated system and methods for application of beehive treatments to beehives. The beehive treatment may include any appropriately desired beehive treatment for delivery to a beehive. For example, in certain embodiments the beehive treatment may include a honeybee pest product, a honeybee predator control product, a honeybee parasite control product, a honeybee disease control product, and combinations thereof. In certain embodiments, the beehive treatment may include a phage-based pesticide. In particular, the phage-based pesticide may include a phage-based pesticide such as described in U.S. patent application Ser. No. 18/040,742, entitled PHAGE-BASED PESTICIDE AGAINST VARROA DESTRUCTOR, which is incorporated herein by reference.

In certain embodiments, an automated system for application of a beehive treatment to a beehive may include a movable carriage and a reservoir disposed on the movable carriage that is configured to hold the beehive treatment. The automated system may further include a vision system to detect an entrance to the beehive, and an applicator system that is in fluid communication with the reservoir. The applicator system may facilitate delivery of the beehive treatment from the reservoir to the beehive. There may also be a controller that is in electrical communication with the automated system, so the controller may be configured to direct movements and orientations of the movable carriage, the vision system, and the applicator system. Further, there may be a wireless transceiver that permits electrical communication between the controller and a network.

In certain embodiments, a method for application of the beehive treatment to a beehive is provided, which may include operation of an automated system for application of a beehive treatment to a beehive. The method may include providing an automated system having: a movable carriage, a reservoir configured to hold the beehive treatment, and a vision system configured to detect the entrance to the beehive. The automated system may further include an applicator system that is in fluid communication with the reservoir, the applicator system may have an end effector configured to deliver the beehive treatment to the entrance of the beehive. The automated system may also include a controller that is in communication with the movable carriage, the vision system, and the applicator system. The method may include, first, the controller moving the movable carriage to a position adjacent to the beehive. Next, the vision system may detect the entrance of the beehive, where the vision system may be directed by the controller. The controller may then move the end effector of the applicator system to a position adjacent to the entrance to the beehive. The method may include a step of delivering the beehive treatment to the beehive through the entrance to the beehive.

In certain embodiments, the method may be configured with steps to navigate and administer beehive treatments to an entire apiary. The apiary may have a plurality of beehives arranged in rows, and the movable carriage may be employed to move adjacent to each of the beehives in succession. The method may include the steps of, engaging the vision system to locate rows of beehives, the vision system then navigating between the rows of beehives without disturbing them, and the movable carriage then coming to rest adjacent each beehive entrance in succession. The vision system, and subsequent carriage movement, may be directed by the controller.

In certain embodiments, an automated system for application of a beehive treatment to a beehive may comprise a movable carriage, a reservoir configured to hold the beehive treatment, a vision system, an applicator system in fluid communication with the reservoir, a controller, and a pump. The reservoir may be disposed on the movable carriage. The vision system may be disposed on the movable carriage and configured to detect an entrance of the beehive. The vision system may include a camera, a light source, and an actuator configured to control an orientation of the camera. The vision system may further include a lighting source. The actuator may be in electrical communication with a controller.

In certain embodiments, the applicator system may be in fluid communication with the reservoir. The applicator system may include an end effector configured to deliver the beehive treatment to the beehive through the entrance to the beehive. The end effector of the applicator system may include a nozzle configured for spraying of the beehive treatment, where the reservoir may be in fluid communication with the nozzle of the applicator system through a fluid supply line. The applicator system may further include a manipulator for positioning the end effector of the applicator system. The manipulator may be a multi-axis robotic arm. The manipulator may also include a fluid inlet, a valve, and a fluid outlet. The fluid inlet may be in fluid communication with the reservoir, where the fluid inlet is in further fluid communication with the end effector. The valve may be disposed between the fluid inlet and the fluid outlet. The valve may be configured to move between an open position and a closed position to control a flow of the beehive treatment from the fluid inlet to the fluid outlet.

The controller may be in communication with the movable carriage, the vision system, and the applicator system. The controller may be configured to move the movable carriage to a position adjacent to the beehive. The movable carriage may have a plurality of wheels and a motor configured to drive the plurality of wheels. The controller may be in electrical communication with the motor and be configured to control an operation of the motor, detect the entrance of the beehive with the vision system, move the end effector of the applicator system to a position adjacent the entrance to the beehive, and deliver the beehive treatment to the beehive through the entrance to the beehive.

A pump may be in fluid communication with the fluid supply line and in electrical communication with the controller. The controller may be configured to control an operation of the pump for the spraying of the beehive treatment via the nozzle, where the fluid supply line connects a fluid outlet of the reservoir to a fluid inlet of the end effector of the applicator system. A wireless transceiver may permit electrical communication of the controller with a network.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIGS. 5A-5D are a series of drawings showing aspects of a method of operating an automated system for application of a beehive treatment to a beehive, where the method includes moving a movable carriage to a position adjacent the beehive, detecting an entrance of the beehive with a vision system, moving an end effector of an applicator system to a position adjacent the entrance to the beehive, and delivering the beehive treatment to the beehive through the entrance to the beehive, according to an embodiment of the present disclosure.

FIG. 6 is a drawing showing an automated system for application of a beehive treatment to a beehive by applying the beehive treatment to a series of beehives using multiple automated systems, according to an embodiment of the present disclosure.

Figure 7:
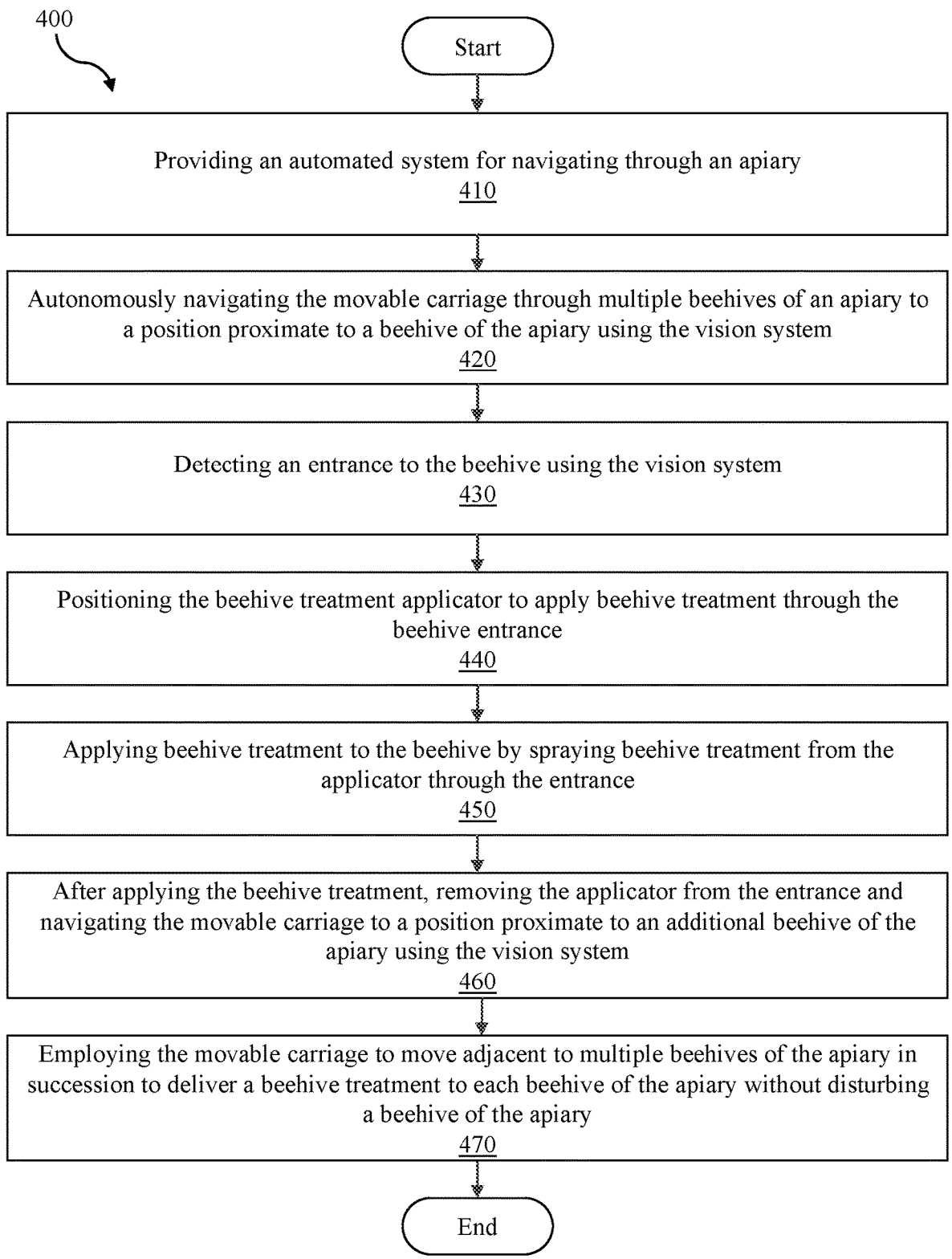

FIG. 7 is a flowchart illustrating a method for application of a beehive treatment to a beehive, according to an embodiment of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About"

when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments of the present technology are provided with reference to the several figures enclosed herewith.

Figure 1:
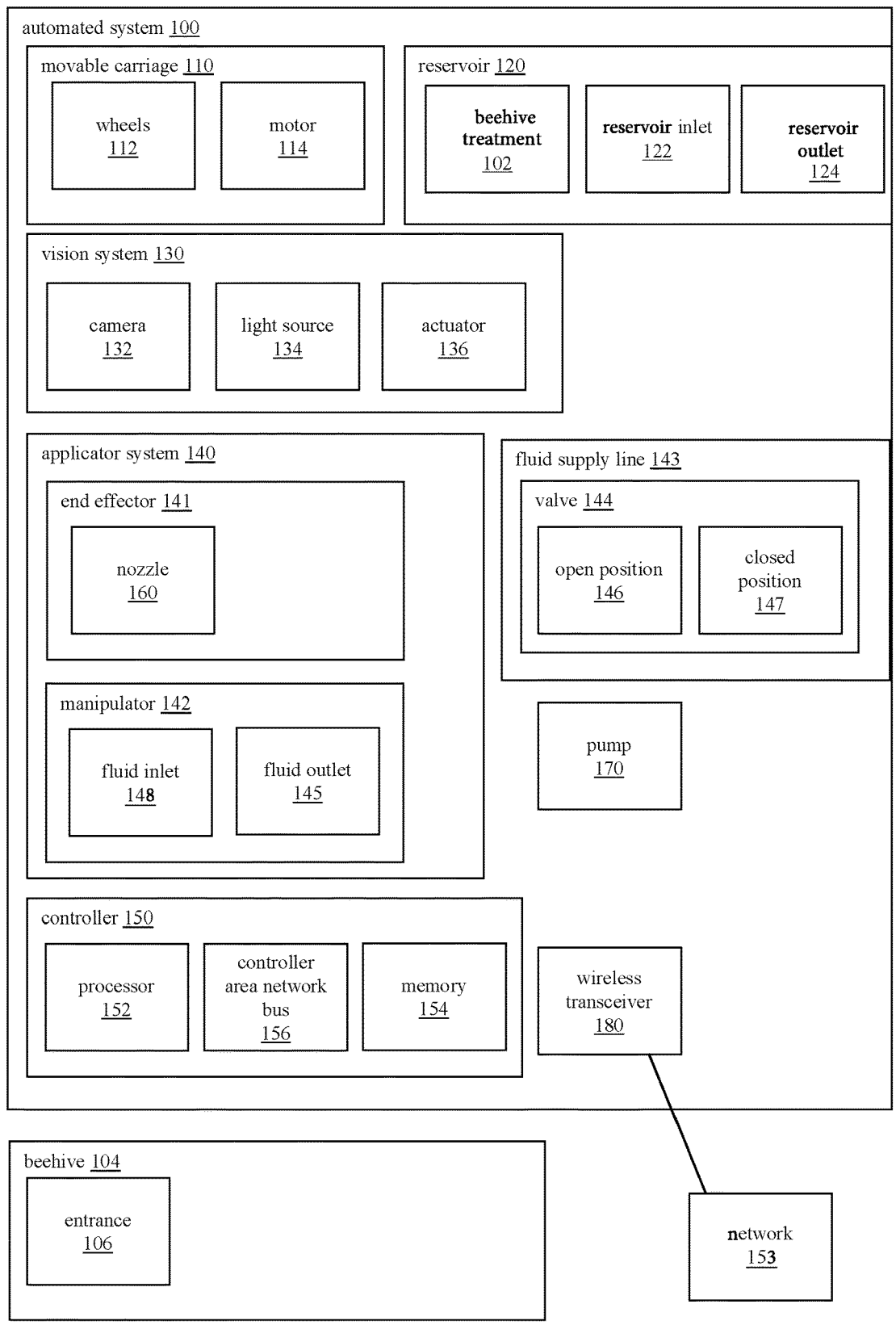
FIG. 1 is a block diagram illustrating an automated system for application of a beehive treatment to a beehive, according to an embodiment of the present disclosure.

FIG. 1 is a block diagram that describes an automated system 100 for delivering a beehive treatment 102 to a beehive 104, according to certain embodiments of the present disclosure. The automated system 100 may include a movable carriage 110. Disposed on the movable carriage 110, there may be a vision system 130 to detect a beehive entrance 106, a reservoir 120 configured to hold the beehive treatment 102, an applicator system 140 that is in fluid communication with the reservoir 120, a controller 150, a wireless transceiver 180 that permits electrical communication between the controller 150 and a network 153.

The movable carriage 110 may include the following aspects. The movable carriage 110 may include a plurality of wheels 112. The plurality of wheels 112 may be in direct contact with the ground in order to propel and steer the movable carriage 110 or may operate to drive one or more tracks to propel and steer the movable carriage 110. The movable carriage 110 may also include a motor 114 in electrical communication with the controller 150 that is configured to drive the wheels 112. However, the movable carriage 110 may employ any system of movement deemed appropriate by one skilled in the art.

The vision system 130 may include the following aspects. The vision system 130 may include a camera 132 and a light source 134. The vision system 130 may further include an actuator 136 that may be in electrical communication with the controller 150, so that based on visual information gathered by the vision system 130, the actuator 136 may control movement and orientation of the camera 132, and the light source 134. The controller 150 may be configured to direct the vision system 130 to locate the beehive entrance 106.

The reservoir 120 may include the following aspects. The reservoir 120 may have a reservoir inlet 122, so that the reservoir 120 may be filled with the beehive treatment 102. The reservoir 120 may also include a reservoir outlet 124, so the reservoir 120 may transfer fluid to the applicator system 140. The reservoir 120 can hold the beehive treatment 102.

The applicator system 140 may include the following aspects. The applicator system 140 may include a manipulator 142, and an end effector 141 that is disposed on the manipulator 142. The manipulator 142 may be configured to position the end effector 141 adjacent to the beehive entrance 106. In certain embodiments, the manipulator 142 may be a multi-axial robotic arm. However, the automated system 100 may employ any type of manipulator 142 to direct and deliver the beehive treatment 102 as deemed appropriate by one skilled in the art. The end effector 141 may include a nozzle 160 configured to spray or otherwise deliver beehive treatment 102 into the beehive entrance 106. However, the end effector 141 may be of any design as deemed appropriate by one skilled in the art.

Dispensing, control, and movement of the beehive treatment 102 by the automated system 100 can include the following aspects. The reservoir 120, the manipulator 142, and the end effector 141 may be in fluid communication together via a fluid supply line 143. As such, the manipulator 142 may have a fluid inlet 148 configured to receive beehive treatment 102, and a fluid outlet 145 configured to release beehive treatment 102. The fluid supply line 143 may connect the reservoir outlet 124 of the reservoir 120, to the fluid inlet 148 of the manipulator 142 so that beehive treatment 102 may travel from the reservoir 120 into the applicator system 140. The fluid supply line 143 may further extend to connect the fluid outlet 145 of the manipulator 142 to the end effector 141, so that beehive treatment 102 may be released from the applicator system 140 and administered to the beehive 104. A valve 144 may be disposed in the fluid supply line 143 between the fluid inlet 148 and the fluid outlet 145 of the manipulator 142. The valve 144 may be configured to move between an open position 146 and a closed position 147, to control the flow of beehive treatment 102 from the fluid supply line 143 to the end effector 141. A pump 170 may be in fluid communication with the fluid supply line 143 that is also in electrical communication with the controller 150. In such an embodiment, the controller 150 may be configured to control operation of the pump 170, which may affect pressure and flow of the beehive treatment 102 as it moves through, and exits the applicator system 140.

The controller 150 may include the following aspects. The controller 150 may include a processor 152 and a controller area network bus 156. The controller 150 may also include a memory 154 on which non-transitory processor-executable instructions may be tangibly embodied. The non-transitory processor-executable instructions may be configured to provide for automated movement and operation of the automated system 100 for the application of the beehive treatment 102 to the beehive 104. The controller 150 may be configured to provide for the following automated system 100 operations: moving the movable carriage 110 to a position adjacent the beehive 104, detecting the beehive entrance 106 with the vision system 130, moving the applicator system 140 to a position adjacent the beehive entrance 106, and directing delivery of the beehive treatment 102 via the end effector 141 to the beehive 104 through the beehive entrance 106.

In certain embodiments, the vision system 130 may include image processing capabilities to identify a beehive entrance 106 by contours, edges, patterns, or features indicative of a beehive entrance 106 in captured images. The vision system 130 may also include a camera 132 coupled with a computer vision algorithm to detect and localize the beehive entrance 106. For example, the computer vision algorithm may include edge detection, shape detection, motion tracking, or machine learning capabilities to recognize the beehive entrance 106. In certain embodiments, the vision system 130 may calculate a set of spatial coordinates defining the position of the beehive entrance 106 and provide the coordinates to the controller 150.

In certain embodiments, the controller 150 may utilize spatial coordinate information to maneuver and align the applicator system's 140 nozzle 160 with the beehive entrance 106. Detecting the beehive entrance 106 may further include capturing images of the beehive 104 surface and processing the images using computer vision techniques to identify feature points representing the beehive entrance 106. In particular, calculating a bounding region encompassing the beehive entrance 106 feature points and determining a centroid point as a target for alignment of the beehive treatment 102 applicator.

In certain embodiments, the vision system 130 may include stereo cameras to provide depth perception capabilities and determine three-dimensional coordinates of the beehive entrance 106. The applicator system 140 may position the nozzle 160 according to the three-dimensional coordinates provided by the vision system 130 to accurately align with the beehive entrance 106 in 3D space. The vision system 130 may incorporate machine learning to build a trained model able to recognize beehive entrance 106 characteristics amidst complex backgrounds.

Figure 2:
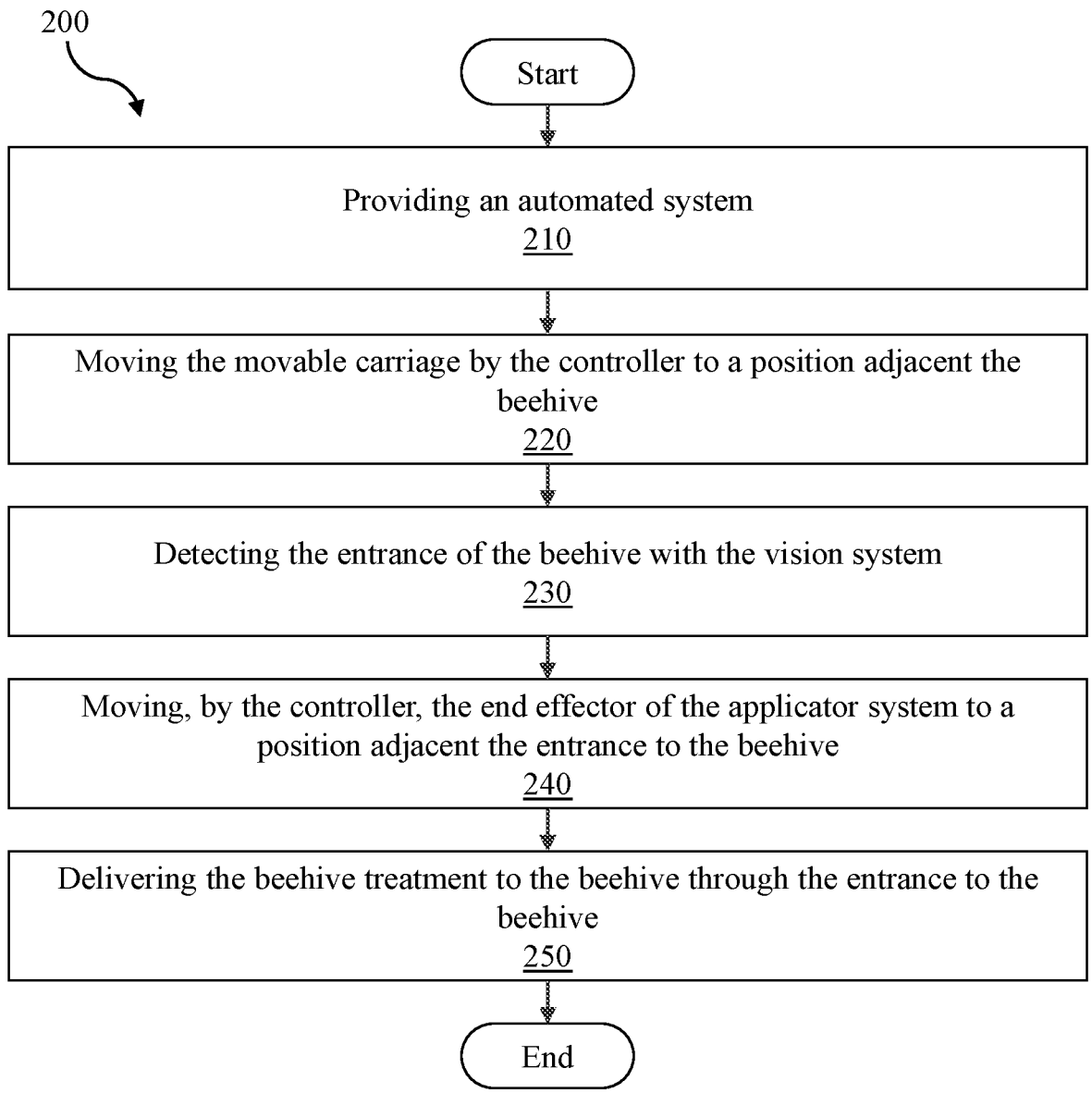
FIG. 2 is a flowchart illustrating a method for application of a beehive treatment to a beehive, according to an embodiment of the present disclosure.

FIG. 2 is a flowchart showing a method 200 for an application of beehive treatment 102 to a beehive 104 according to certain embodiments of the present disclosure. At a first step 210, the automated method may include providing an automated system 100, such as one of the various automated system 100 embodiments provided herein. The automated system 100 may have a movable carriage 110, a reservoir 120 configured to hold the beehive treatment 102 that is disposed on the movable carriage 110, a vision system 130 that is also disposed on the movable carriage 110 and configured to detect a beehive entrance 106, and an applicator system 140 in fluid communication with the reservoir 120. The applicator system 140 may include an end effector 141 that is configured to deliver the beehive treatment 102 to the beehive 104 through the beehive entrance 106, and a controller 150 that may be in electrical communication with the movable carriage 110, the vision system 130, and the applicator system 140.

In a second step 220, the automated method 200 may include moving the movable carriage 110, possibly by the controller 150, to a position adjacent to the beehive 104. As seen in FIG. 2, in a third step 230, the automated method 200 may include detecting the beehive entrance 106 with the vision system 130. Then, in a fourth step 240, the automated method 200 may include moving the end effector 141 of the applicator system 140, by the controller 150, to a position adjacent to the beehive entrance 106. Then at a fifth step 250, the automated method 200 may include delivering the beehive treatment 102 to the beehive 104 through the beehive entrance 106.

Figure 3:
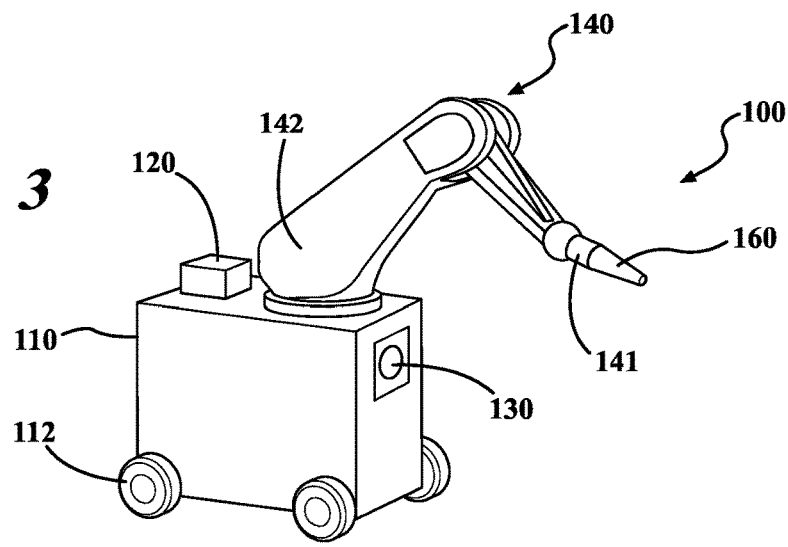
FIG. 3 is a drawing showing an automated system for application of a beehive treatment to a beehive, according to an embodiment of the present disclosure.

With reference to FIG. 3, certain embodiments include an automated system 100 for delivering a beehive treatment 102 configured as shown, where the automated system 100 may be configured to deliver the beehive treatment 102 to multiple beehives 104. As described herein, the automated system 100 may include a movable carriage 110, a reservoir 120 configured to hold the beehive treatment 102 that is disposed on the movable carriage 110, a vision system 130 that is also disposed on the movable carriage 110 and is configured to detect a beehive entrance 106, an applicator system 140 in fluid communication with the reservoir 120. The applicator system 140 may include end effector 141 that is configured to deliver the beehive treatment 102 to the beehive 104 through the beehive entrance 106. Although not shown in FIG. 3, a controller 150 may be provided on board the automated system 100, where the controller 150 may be in electrical communication with the movable carriage 110, the vision system 130, and the applicator system 140.

The vision system 130 may include a camera 132 and a light source 134. The vision system 130 may further include an actuator 136 that may be in electrical communication with the controller 150, so that based on visual information gathered by the vision system 130, the actuator 136 may control movement and orientation of the camera 132, and the light source 134. The controller 150 may be configured to direct the vision system 130 to locate a beehive entrance 106.

Figure 4:
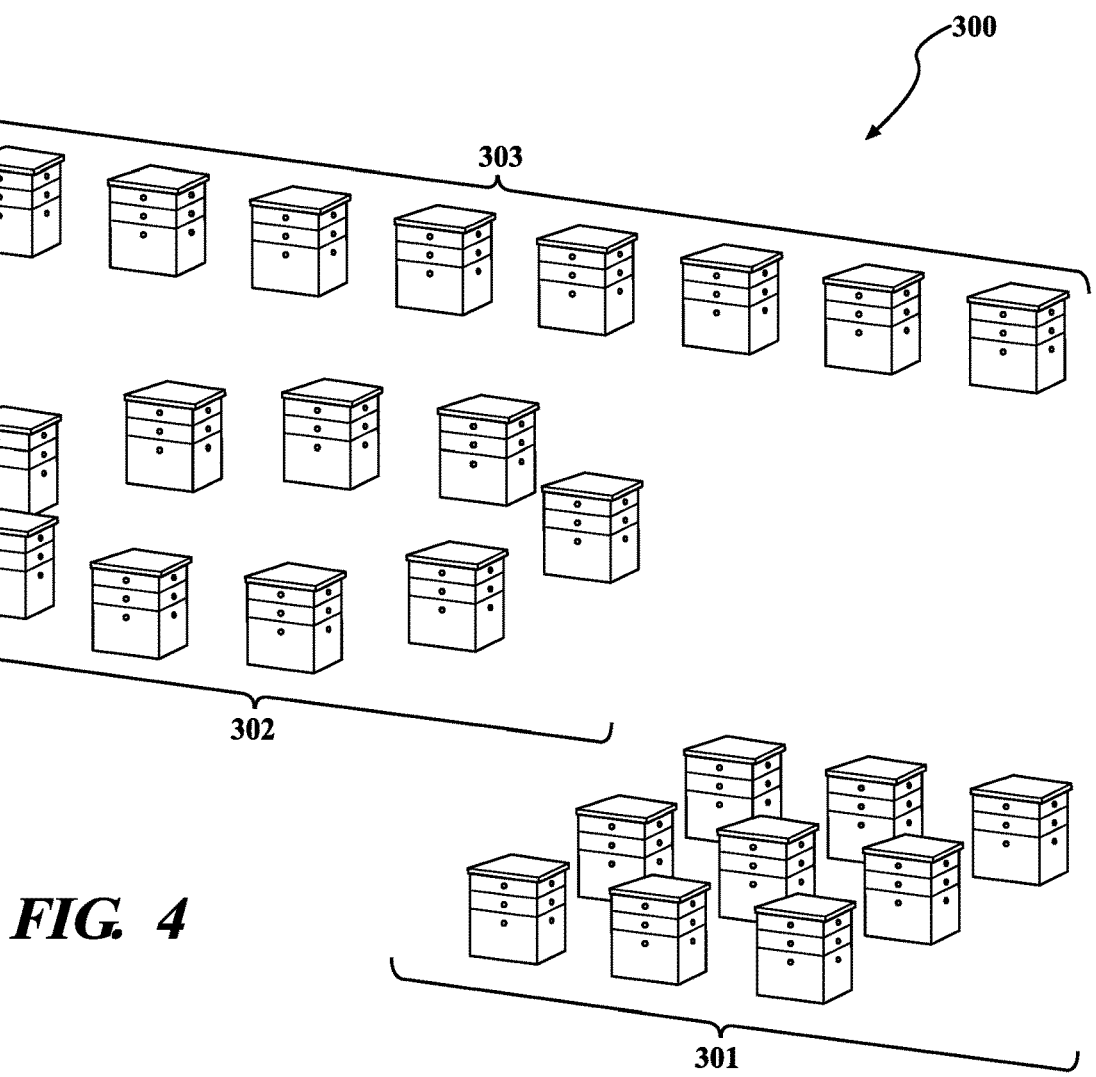
FIG. 4 is a drawing showing a series of apiaries for use with an automated system for application of beehive treatment to a beehive, according to an embodiment of the present disclosure.

As shown within FIG. 4, an apiary 300 including a plurality of beehives 104 may be arranged in a plurality of configurations. For example, the apiary 300 may be arranged in one or more of an array pattern 303, a circle pattern 302, and a lattice shaped pattern 301. In particular, the apiary 300 may be arranged in an appropriately desired pattern as would be known by those skilled in the art. The movable carriage 110 may move the automated system 100 between the individual beehives 104 to deliver the beehive treatment 102 to each beehive 104. The automated system 100 may recognize a preselected pattern of the apiary 300 and/or be configured to learn the pattern of the apiary 300. In this way, the automated system 100 may plan a travel route to minimize a time necessary to provide the beehive treatment 102 to each beehive 104 in the apiary 300 and to ensure that each beehive 104 is treated.

Figure 5A:
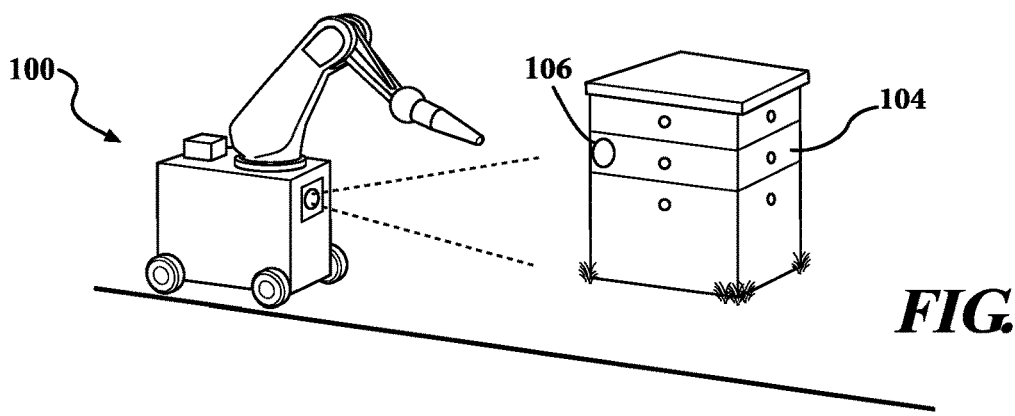
Figure 5B:
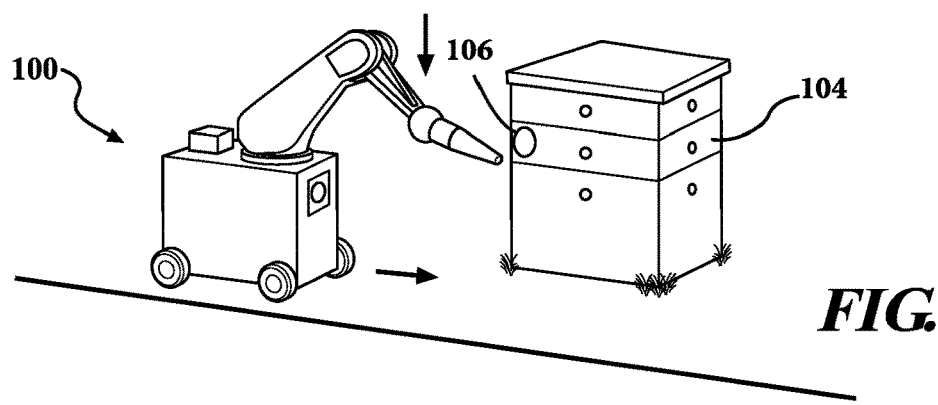
Figure 5C:
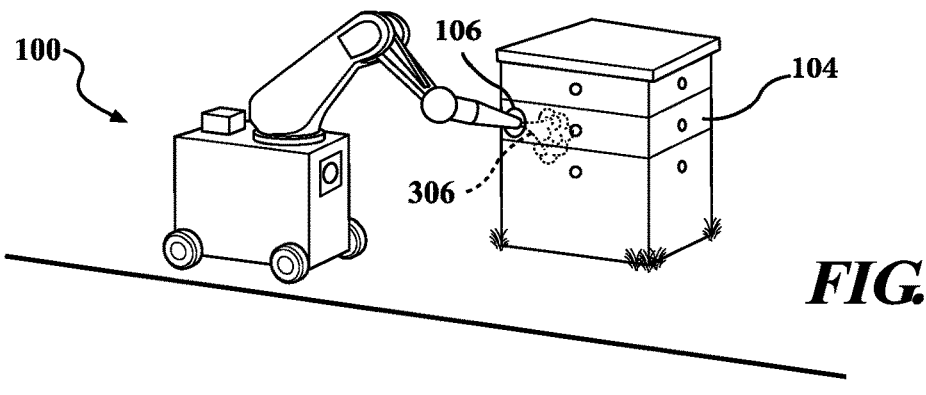
Figure 5D:
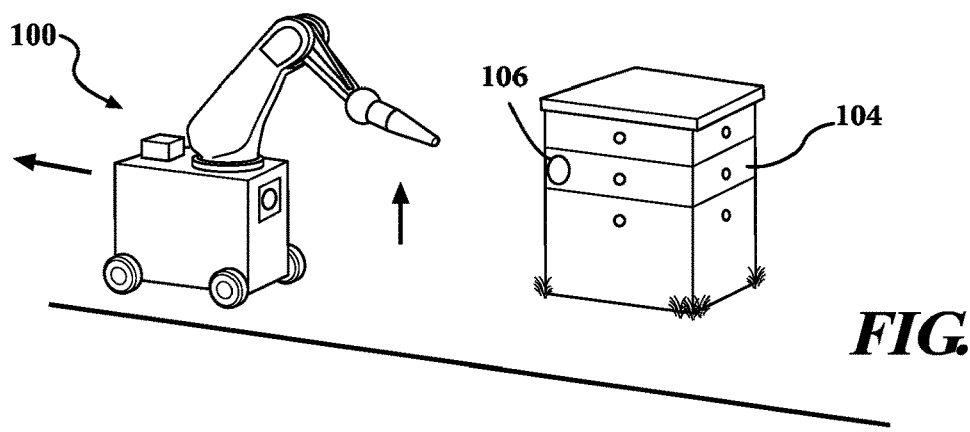

As shown within FIGS. 5A-5D, for example, the automated system 100 may approach a beehive 104 engaging the vision system 130 to locate the beehive 104, manipulate the applicator system 140 to move the end effector 141 and nozzle 160 to a beehive entrance 106, and deliver a beehive treatment 102 through a spray 306 into the beehive 104. In particular, as shown in FIG. 5A, automated system 100 may move the movable carriage 110 using the vision system 130 to a position the movable carriage 110 adjacent to a beehive 104. The beehive entrance 106 may be detected with vision system 130 and as shown in FIG. 5B, and the movable carriage 110 will move to the beehive 104 and the applicator system 140 may move downward to a position adjacent to the beehive entrance 106. As shown in FIG. 5C, the applicator system 140 may be positioned to apply the beehive treatment 102 through the beehive entrance 106 and deliver a beehive treatment 102 through a spray 306 into the beehive 104. Then, as shown by FIG. 5D, after delivering the beehive treatment 102, the automated system 100 may move the applicator system 140 from the beehive entrance 106 of the beehive 104 and back out before delivering a beehive treatment 102 to an additional beehive 104 of the apiary 300.

In certain embodiments, the movable carriage 110 may include proximity sensors configured to detect nearby obstacles and modify the movable carriage 110 movement to avoid contact with a beehive 104. The vision system 130 may recognize obstructions and provide feedback data to the controller 150 enabling navigation around obstacles. In particular, the controller 150 may alter a programmed route based on vision system 130 obstacle feedback to avoid collisions. Sensor data may determine proximity to beehive 104 structures and adjust navigational direction or speed to avoid contact. Traversal of the movable carriage 110 along rows and columns of an apiary 300 may include maintaining a safe buffer distance from beehive 104 structures. Processing beehive 104 structure coordinates and sensor data may model obstacles for collision avoidance in navigation between the beehives 104. Stored location data may include mapped buffer areas around beehive 104 structures representing safety margins for path planning. In certain embodiments, instructions may cause the movable carriage 110 to adjust speed or heading to avoid contact upon detection of objects within a proximity zone along the route of the movable carriage 110.

In certain embodiments, one or more sensors may determine a size and structural parameters of an individual beehive 104. The controller 150 may then adapt beehive treatment 102 dose and flow rate based on sensed beehive 104 dimensions. The vision system 130 may incorporate capabilities for measuring beehive 104 structure volume. In certain embodiments, the controller 150 may select beehive treatment 102 application volume as a function of measured volume. Determining a size of an individual beehive 104 may include using ultrasonic or light detection and ranging sensors and customizing applied beehive treatment 102 dose for sufficient coverage based on hive size. The automated system 100 may further selectively control nozzle spray pressure and duration to modify beehive treatment 102 application rate based on images processed by the vision system 130. The automated system 100 may further determine structural dimensions of an individual beehive 104 using sensors; and adjusting beehive treatment 102 flow rate and duration to provide complete interior coverage according to respective beehive 104 size.

In certain embodiments, a computational system may process beehive 104 sizing and structural data from sensors and control the opening duration and flow rate of the nozzle 160 to customize applied beehive treatment 102 dose. Selecting an appropriate application rate and total dosage for an individual beehive 104 may be based on visual cues from the vision system 130 and historical data. The controller 150 may monitor a flow of the beehive treatment 102 to determine total beehive treatment 102 volume applied and cut off a further application upon reaching a target dose. In certain embodiments, the applicator system 140 may incorporate adjustable components to provide a variation of spray flow rate, spray pattern dimensions and distribution, and total volume released. In certain embodiments, the controller 150 may automatically calibrate adjustable components based on sensed parameters of an individual beehive 104 for customized treatment.

With reference to FIG. 6, an embodiment is shown that uses multiple automated systems 100 for application of one or more beehive treatments 102 to a series of beehives 104, which may include the various patterns of apiaries 300 shown in FIG. 3. For example, the multiple automated systems 100 may be configured to deliver the same beehive treatment 102 to the series of beehives 104 in the apiary 300 to minimize application time. Alternatively, one automated system 100 may be configured to apply a first beehive treatment 102 and another automated system 100 may be configured to apply a second beehive treatment 102 that is different from the first beehive treatment 102.

FIG. 7 is a flowchart that describes an automated method 400 for an application of a beehive treatment 102 to a beehive 104, in accordance with certain embodiments of the present disclosure. The automated system 100 may be configured to navigate and administer a beehive treatment 102 to multiple beehives 104 of an apiary 300. For example, at a first step 410, the automated method 400 may include providing an automated system 100 for navigating through an apiary 300. The automated system 100 may include a movable carriage 110 having disposed thereon the beehive treatment 102, a reservoir 120, a vision system 130, and an applicator system 140 in fluid communication with the reservoir 120. At a second step, 420, the automated method 400 may include autonomously navigating the movable carriage 110 through multiple beehives 104 of the apiary 300 to a position proximate to a beehive 104 of the apiary 300 using the vision system 130. Then, in a third step 430, the automated method 400 may include detecting a beehive entrance 106 using the vision system. Additionally, at a fourth step 440, the automated method 400 may include positioning the applicator system 140 to apply beehive treatment 102 through the beehive entrance 106. Then, at a fifth step 450, the automated method 400 may include applying beehive treatment 102 to the beehive 104 by spraying beehive treatment 102 from the applicator system 140 through the beehive entrance 106. At a sixth step 460, the automated method 400 may further include after applying the beehive treatment 102, removing the applicator system 140 from the beehive entrance 106 and autonomously navigating the movable carriage 110 to a position proximate an additional beehive 104 of the apiary 300 using the vision system 130. In a further seventh step 470, the movable carriage 110 may be employed to move adjacent to multiple beehives 104 of the apiary 300 in succession in order to deliver a beehive treatment to each beehive 104 of the apiary 300 without disturbing a beehive 104 of the apiary 300.

In certain embodiments, engaging the vision system 130 may be engaged to locate rows of beehives 104, the vision system 130 then navigating between the beehives 104 without disturbing them, and the movable carriage 110 then coming to rest adjacent the beehive entrance 106 of each beehive 104 in succession. The vision system 130, and the movable carriage 110 movement may be directed by the controller 150.

In certain embodiments, autonomously navigating the movable carriage 110 may include avoiding contact with objects in a surrounding environment using sensors disposed on the movable carriage 110. In certain embodiments, detecting the beehive entrance 106 may include capturing images using a camera and analyzing the images to identify the location of the beehive entrance 106. The method may further include repeating the steps of autonomously navigating, detecting the beehive entrance 106, positioning the applicator system 140, and applying beehive treatment 102 for additional beehives 104.

In certain embodiments, additional beehives 104 may be arranged in the apiary 300 having rows and columns or in a circular pattern. Autonomously navigating may include traversing through the apiary 300. In certain embodiments, positioning the applicator system 140 may include manipulating a robotic arm to align a nozzle 160 of the applicator system 140 with the beehive entrance 106. In certain embodiments, the method may include maintaining a safe distance from the beehive 104 during application to avoid disturbing bees. Applying the beehive treatment 102 may include controlling flow rate and spray pattern of released beehive treatment 102. In certain embodiments, the steps may be autonomously executed according to executable instructions stored on a non-transitory computer-readable medium.

In certain embodiments, such as shown in FIG. 6, paths between beehives 104 may be rows and columns arranged in a grid-like pattern. In certain embodiments, aligning the nozzle 160 may include manipulating the applicator system 140, such as a movable arm on which the nozzle 160 may be disposed using servo motors and closed loop control. The computer-implemented method may include maintaining at least a minimum standoff distance from a beehive entrance 106 during spraying to avoid disturbing bees. In certain embodiments, the computer-implemented method may include incorporating real-time sensor feedback to detect and avoid obstacles while navigating between beehives 104.

In still certain embodiments, the computer-implemented method may include detecting low beehive treatment 102 level in the reservoir 120. The computer-implemented method may further include navigating to a stationary beehive treatment 102 reservoir to refill the reservoir 120. In certain embodiments, the method may include storing location data describing a position of beehives 104 within the apiary 300. In certain embodiments, the method may include wirelessly transmitting status data to a remote interface.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. An automated system for application of a beehive treatment to a beehive, comprising:
   a movable carriage;
   a reservoir configured to hold the beehive treatment, the reservoir disposed on the movable carriage;
   a vision system disposed on the movable carriage and configured to detect an entrance of the beehive;
   an applicator system in fluid communication with the reservoir, the applicator system including an end effector configured to deliver the beehive treatment to the beehive through the entrance to the beehive; and
   a controller in communication with the movable carriage, the vision system, and the applicator system, the controller configured to move the movable carriage to a position adjacent the beehive, detect the entrance of the beehive with the vision system, move the end effector of the applicator system to a position adjacent the entrance to the beehive, and deliver the beehive treatment to the beehive through the entrance to the beehive.

2. The automated system of claim 1, wherein the movable carriage includes a plurality of wheels and a motor configured to drive the plurality of wheels, the controller in electrical communication with the motor and configured to control an operation of the motor.

3. The automated system of claim 1, wherein the end effector of the applicator system includes a nozzle configured for spraying of the beehive treatment, the reservoir in fluid communication with the nozzle of the applicator system through a fluid supply line.

4. The automated system of claim 3, further comprising a pump in fluid communication with the fluid supply line and in electrical communication with the controller, the controller configured to control an operation of the pump for the spraying of the beehive treatment via the nozzle.

5. The automated system of claim 4, wherein the fluid supply line connects a fluid outlet of the reservoir to a fluid inlet of the end effector of the applicator system.

6. The automated system of claim 1, wherein the vision system includes a camera, a light source, and an actuator configured to control an orientation of the camera, and the light source, wherein the actuator is in electrical communication with the controller.

7. The automated system of claim 1, wherein the applicator system includes a manipulator for positioning the end effector of the applicator system.

8. The automated system of claim 7, wherein the manipulator is a multi-axis robotic arm.

9. The automated system of claim 7, wherein the manipulator includes a fluid inlet and a valve, and a fluid outlet, the fluid inlet in fluid communication with the reservoir, the fluid inlet in fluid communication with the end effector.

10. The automated system of claim 9, where the valve is disposed between the fluid inlet and the fluid outlet and is configured to move between an open position and a closed position, the valve configured to control a flow of the beehive treatment from the fluid inlet to the fluid outlet.

11. The automated system of claim 1, wherein the controller includes a processor and a memory on which non-transitory processor-executable instructions are tangibly embodied, the non-transitory processor-executable instructions configured to provide for an automated movement and operation of the automated system for the application of the beehive treatment to the beehive.

12. The automated system of claim 11, the controller includes a controller area network bus.

13. The automated system of claim 12, further including a wireless transceiver that permits electrical communication of the controller with a network.

14. A method for application of a beehive treatment to a beehive, the method comprising steps of:
 providing an automated system having a movable carriage, a reservoir configured to hold the beehive treatment, the reservoir disposed on the movable carriage, a vision system disposed on the movable carriage and configured to detect an entrance of the beehive, an applicator system in fluid communication with the reservoir, the applicator system including an end effector configured to deliver the beehive treatment to the beehive through the entrance to the beehive, and a controller in communication with the movable carriage, the vision system, and the applicator system;
 moving, by the controller, the movable carriage to a position adjacent the beehive;
 detecting the entrance of the beehive with the vision system;
 moving, by the controller, the end effector of the applicator system to a position adjacent the entrance to the beehive; and
 delivering the beehive treatment to the beehive through the entrance to the beehive.

15. The method of claim 14, further comprising a step of providing an apiary having a plurality of beehives, the plurality of beehives including the beehive to which the beehive treatment is provided in the step of delivering the beehive treatment.

16. The method of claim 15, wherein the plurality of beehives are arranged in rows, and the step of moving, by the controller, the movable carriage to the position adjacent the beehive includes a step of navigating the movable carriage between the rows without disturbing the plurality of beehives.

17. The method of claim 16, wherein the step of navigating the movable carriage between the rows is performed by the vision system locating the rows and providing a location of the rows to the controller.

18. The method of claim 14, wherein moving, by the controller, the end effector of the applicator system to a position adjacent the entrance to the beehive includes manipulating a robotic arm to align the end effector of the applicator system with the entrance.

19. An automated system for application of a beehive treatment to a beehive, comprising:
 a movable carriage;
 a reservoir configured to hold the beehive treatment, the reservoir disposed on the movable carriage;
 a vision system disposed on the movable carriage and configured to detect an entrance of the beehive, wherein the vision system includes a camera, a light source, and an actuator configured to control an orientation of the camera, and the light source, wherein the actuator is in electrical communication with a controller;
 an applicator system in fluid communication with the reservoir, the applicator system including an end effector configured to deliver the beehive treatment to the beehive through the entrance to the beehive,
  wherein the end effector of the applicator system includes a nozzle configured for spraying of the beehive treatment, the reservoir in fluid communication with the nozzle of the applicator system through a fluid supply line,
  wherein the applicator system includes a manipulator for positioning the end effector of the applicator system, and wherein the manipulator is a multi-axis robotic arm, wherein the manipulator includes a fluid inlet and a valve, and a fluid outlet, the fluid inlet in fluid communication with the reservoir, the fluid inlet in fluid communication with the end effector, and
  wherein the valve is disposed between the fluid inlet and the fluid outlet and is configured to move between an open position and a closed position, the valve configured to control a flow of the beehive treatment from the fluid inlet to the fluid outlet;
 the controller in communication with the movable carriage, the vision system, and the applicator system, the controller configured to
  move the movable carriage to a position adjacent the beehive, wherein the movable carriage includes a plurality of wheels and a motor configured to drive the plurality of wheels, the controller in electrical communication with the motor and configured to control an operation of the motor,
  detect the entrance of the beehive with the vision system,
  move the end effector of the applicator system to a position adjacent the entrance to the beehive, and
  deliver the beehive treatment to the beehive through the entrance to the beehive; and
 a pump in fluid communication with the fluid supply line and in electrical communication with the controller, the controller configured to control an operation of the pump for the spraying of the beehive treatment via the nozzle, wherein the fluid supply line connects a fluid outlet of the reservoir to a fluid inlet of the end effector of the applicator system.

20. The automated system of claim 19, further including a wireless transceiver that permits electrical communication of the controller with a network.

\* \* \* \* \*